Sept. 6, 1932.　　W. M. HANSON　　1,875,449
SEAT
Filed Nov. 10, 1930　　2 Sheets-Sheet 1

INVENTOR.
WALTER M. HANSON
BY
ATTORNEYS.

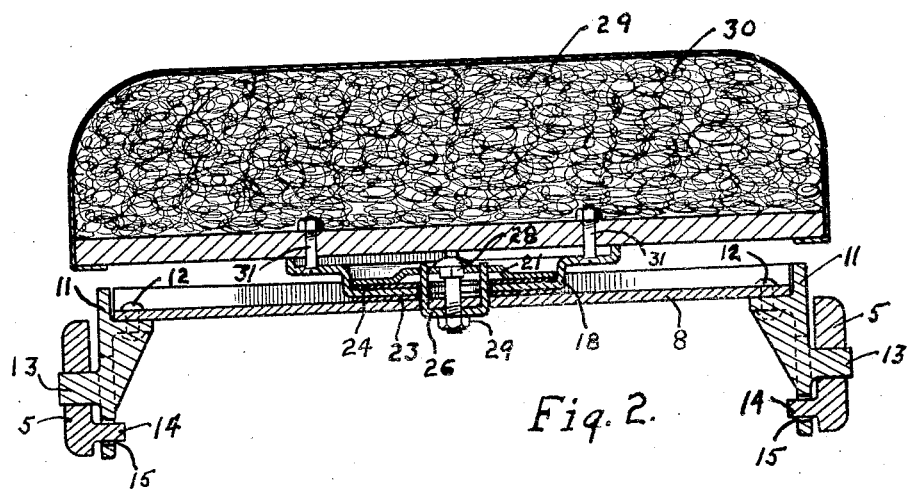
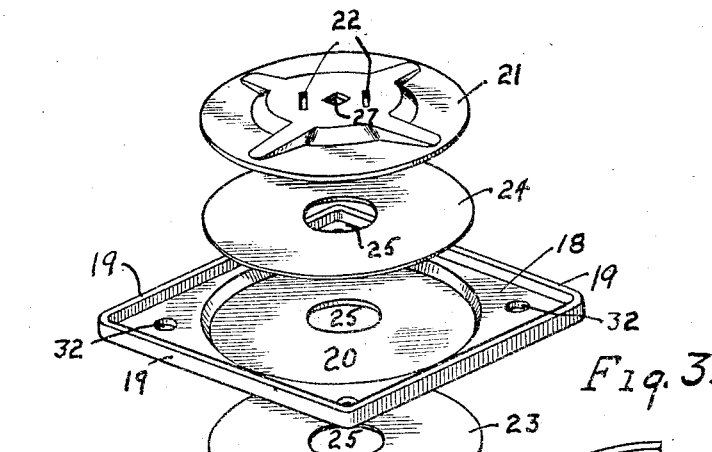
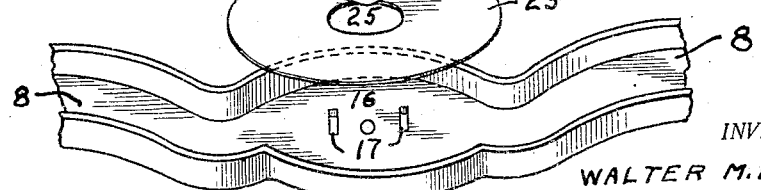
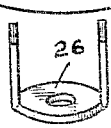

Patented Sept. 6, 1932

1,875,449

UNITED STATES PATENT OFFICE

WALTER M. HANSON, OF GRAND RAPIDS, MICHIGAN, ASSIGNOR TO AMERICAN SEATING COMPANY, OF GRAND RAPIDS, MICHIGAN, A CORPORATION OF NEW JERSEY

SEAT

Application filed November 10, 1930. Serial No. 494,472.

The present invention relates to seats and more particularly to seats especially adapted for use in theatres, auditoriums and other similar places.

The main objects of the invention are to provide a seat of the character above specified which is rotatably mounted; to provide a theatre seat which may be revolved when occupied; to provide a seat which is horizontally rotatable and vertically swingable; to provide a seat which when occupied permits ready ingress and egress of other persons passing such occupied seat without undue annoyance and discomfort to the occupant; and, to provide a seat having novel features for attaining the above objects.

An illustrative embodiment of the invention is shown in the accompanying drawings, wherein:—

Figure 2 is a cross sectional view thereof taken on line 2—2 of Figure 1; and

Figure 3 is an enlarged perspective view of several unassembled individual parts disposed with respect to their assembled relation.

Figure 1:
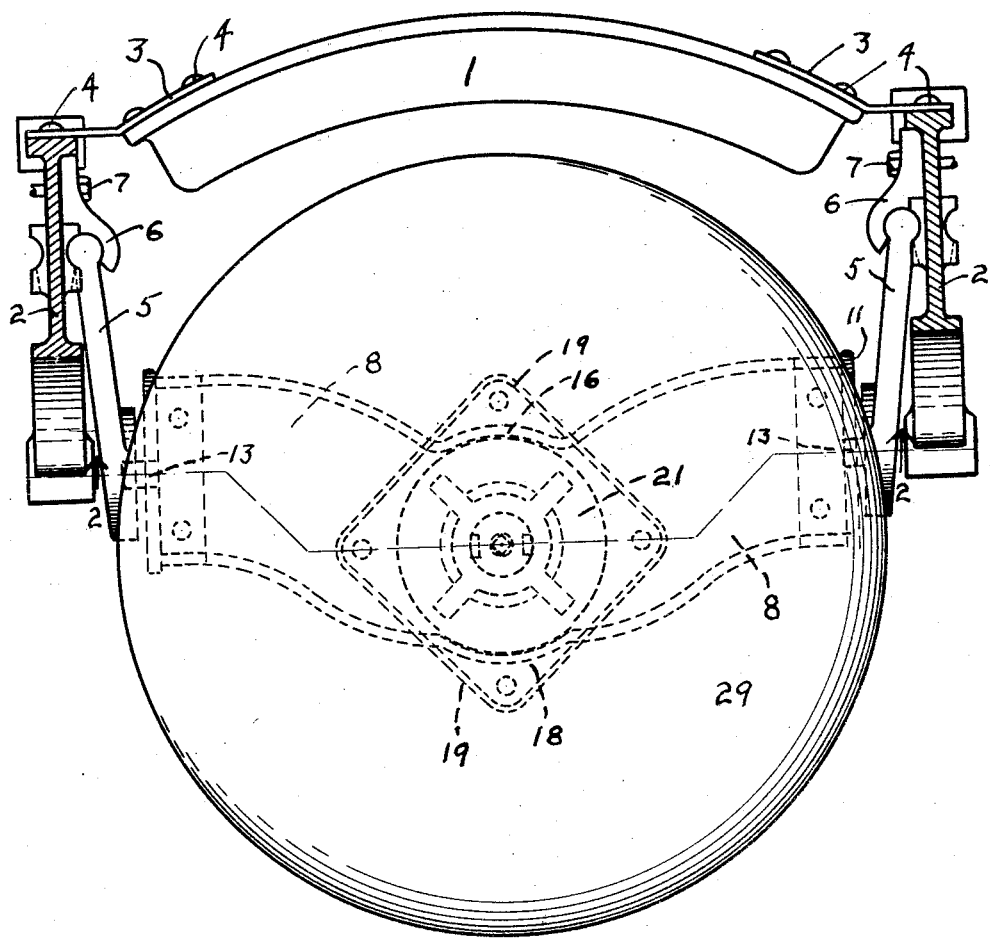
Figure 1 is a top plan view of the seat, partly in section, the dotted lines indicating hidden parts and the manner of their assembly.

The seat structure herein shown and described, is particularly adapted for use in theatres, civic auditoriums, and other similar public and semi-public places. The seat is rotatable by the occupant and is so designed that occupants thereof need not rise but merely turn when other persons seek egress or ingress past such occupied seats.

Referring to the drawings in which like numerals represent like parts in the several views, a seat back 1 of circular form is rigidly secured between a pair of vertically disposed seat ends 2 by means of supporting brackets 3 secured to the seat ends and the seat back by rivets 4. Seating in arcuate rows is provided by means of a pair of laterally disposed arms 5 which are adjustably horizontally swingably secured to the seat ends on their inner sides by means of clamps 6 and the adjusting bolts 7.

A channel bar strut 8 is rigidly secured to a pair of brackets 11 by rivets 12, the bracket trunnions 13 being vertically swingably mounted inside the outer ends of the arms 5. The swinging movement of the strut is limited by the lugs 14 projecting through the arcuate slots 15 of the brackets 11.

The strut has a widened medial portion forming an annular recess 16 which is provided with a pair of oppositely disposed apertures 17 here shown as slots. A seat supporting member 18 having peripheral flanged edges 19 has a dished portion 20 adapted to rotatably fit within the annular recess 16 of the strut 8.

A clamping member 21 provided with a pair of oppositely disposed slots 22, registering with the slots 17 of the strut when in assembled relation, is adapted to fit within the dished portion 20 of the seat supporting member.

A pair of friction bearing discs 23, 24 of fibre or other suitable composition are disposed on opposite sides of the seat supporting member between the strut and the clamping plate and each disc and the seat supporting member are provided with registering circular openings 25 for purposes hereinafter explained.

A key 26 here shown as a bifurcated member is passed upwardly through the slots 17 of the strut through the centrally disposed circular openings 25 of the disc 23, member 18 and disc 24 respectively, and through the slots 22 of the clamping plate 21. The clamping plate is provided with a squared opening 27 between the slots 22 for receiving the square head of the bolt 28 which passed through the clamping plate 21, disc 24, seat supporting member 18, disc 23, and strut 8 respectively and which with its nut 29 and the key 26 serves to rotatably secure the seat supporting member 18 and the clamping plate 21 to the strut 8 when in their assembled relation.

The seat 29 is provided with a suitable filler 30 such as hair or the like and is secured to the seat supporting member by bolts 31 passing through apertures 32 therein.

It will thus be seen that the seat not only swings on its horizontal axis but may likewise be rotated by the occupant thereof who need not rise when other persons seek ingress and egress past such occupied seat.

While but one specific embodiment of this invention has been herein shown and described, it will be understood that numerous details of the construction shown may be altered or omitted without departing from the spirit of this invention as defined by the following claims.

I claim:

1. In a device of the class described, a pair of spaced strut supporting members, a strut tiltably secured at its respective ends to said strut supporting members, said strut having a widened medial portion provided with an annular recess, a seat supporting member having a dished portion fitting within said recess, and means for rotatably securing said seat supporting member to said strut.

2. In a device of the class described, a pair of seat ends, a channel bar strut secured therebetween and having a widened medial portion forming an annular recess, a seat supporting member having a dished portion fitting within said recess, a clamping plate fitting within said dished portion, friction bearing discs interposed on opposite sides of the seat supporting member between said strut and said clamp, and means for rotatably securing said seat supporting member and the clamping plate to said strut.

3. In a device of the class described, a pair of seat ends, a strut horizontally turnably secured therebetween and having a widened medial portion provided with an annular recess, a seat supporting member having a dished portion fitting within said recess, and means for rotatably securing said seat supporting member to said strut.

4. In a device of the class described, a pair of seat ends, a channel bar strut horizontally turnably secured therebetween and having a widened medial portion forming an annular recess, a seat supporting member having a dished portion fitting within said recess, a clamping plate fitting within said dished portion, friction bearing discs interposed on opposite sides of the seat supporting member between said strut and said clamp, and means for rotatably securing said seat supporting member and the clamping plate to said strut.

In testimony whereof I have hereunto set my hand at Grand Rapids, Michigan, this 7th day of November, 1930.

WALTER M. HANSON.